(12) United States Patent
Sjovall et al.

(10) Patent No.: US 12,384,476 B2
(45) Date of Patent: Aug. 12, 2025

(54) HYDRAULIC ACTUATED TRAILER FLIP-AXLE

(71) Applicant: BULL MOOSE HEAVY HAUL, INC., Chesterfield, MO (US)

(72) Inventors: Jeremy James Sjovall, Burbank, SD (US); Scott Daniel Reithmeier, Missoula, MT (US); Madison Lee Gravel, Central City, IA (US); Timothy John McGreal, Manchester, IA (US)

(73) Assignee: BULL MOOSE HEAVY HAUL, INC., Chesterfield, MO (US)

( * ) Notice: Subject to any disclaimer, the term of this patent is extended or adjusted under 35 U.S.C. 154(b) by 0 days.

(21) Appl. No.: 18/665,874

(22) Filed: May 16, 2024

(65) Prior Publication Data

US 2024/0391543 A1 Nov. 28, 2024

Related U.S. Application Data

(60) Provisional application No. 63/502,526, filed on May 16, 2023.

(51) Int. Cl.
*B62D 61/12* (2006.01)

(52) U.S. Cl.
CPC .................. *B62D 61/125* (2013.01)

(58) Field of Classification Search
CPC ............................ B62D 61/125; B62D 63/061
See application file for complete search history.

(56) References Cited

U.S. PATENT DOCUMENTS

| | | |
|---|---|---|
| 3,915,470 A | 10/1975 | Jansen |
| 4,079,798 A | 3/1978 | Ferris |
| 4,576,390 A | 3/1986 | Vos |
| 4,705,133 A | 11/1987 | Christenson et al. |
| 4,848,783 A | 7/1989 | Christenson et al. |
| 5,018,593 A | 5/1991 | Hermann |
| 6,189,901 B1 | 2/2001 | Smith et al. |
| 6,315,311 B1 * | 11/2001 | Mathiowetz ......... B62D 61/125 180/209 |
| 7,222,867 B2 | 5/2007 | Rotz et al. |
| 7,658,587 B1 * | 2/2010 | Dierks .................... B60P 3/066 296/184.1 |
| 7,857,331 B2 | 12/2010 | Walters, Jr. |
| 10,421,506 B2 | 9/2019 | Schattgen et al. |

FOREIGN PATENT DOCUMENTS

FR 2382366 A1 9/1978

\* cited by examiner

*Primary Examiner* — Jason D Shanske
*Assistant Examiner* — Joselynn Y Sliteris (57) ABSTRACT

A system for moving a flip axle assembly relative to a trailer, includes a trailer pivotally connected to a flip axle assembly, where a rotation assembly moves the flip axle assembly between a ground-engaging position and a stowed position. The rotation assembly includes a first linkage connected to the flip axle assembly, and a second linkage pivotally connected to the first linkage, forming a second pivot connection. A hinge is connected to the trailer, with the hinge being pivotally connected to the second linkage forming a third pivot connection. A rotation mechanism is operably connected to the rotation assembly for moving the flip axle assembly between the ground-engaging position and the stowed position.

20 Claims, 12 Drawing Sheets

HYDRAULIC ACTUATED TRAILER FLIP-AXLE

CROSS-REFERENCE TO RELATED APPLICATIONS

This application claims the benefit of priority to U.S. Non-Provisional Patent Application No. 63/502,526, filed May 16, 2023, the contents of which are incorporated by reference herein in its entirety.

BACKGROUND

1. Field of the Disclosed Subject Matter

Wheeled running gear, namely auxiliary axle assemblies for towed trailers.

SUMMARY

The disclosure includes an apparatus for moving a flip axle assembly relative to a trailer, including a trailer with mounting brackets connected to attachment brackets connected to a flip axle assembly, where a rotation assembly moves the flip axle assembly between a ground-engaging position and a stowed position. In some embodiments a first mounting bracket is connected to the trailer, and a first attachment bracket is pivotally connected to the first mounting bracket forming a first pivot connection, where the first attachment bracket is connected to the flip axle assembly. The rotation assembly includes a first linkage connected to the first attachment bracket, and a second linkage pivotally connected to the first linkage, forming a second pivot connection. A hinge is connected to the trailer, with the hinge being pivotally connected to the second linkage forming a third pivot connection. A rotation mechanism is operably connected to the rotation assembly for moving the flip axle assembly between the ground-engaging position and the stowed position. The arrangement of pivot connections positions the third pivot connection below and rearward of the first pivot connection.

In some embodiments, the apparatus includes a second mounting bracket connected to the trailer, and a second attachment bracket pivotally connected to the second mounting bracket, where the second attachment bracket is connected to the axle assembly. A crossbar is connected to the first attachment bracket and the second attachment bracket, and the first linkage is connected to the first attachment bracket by the crossbar.

In some aspects, the first linkage of the rotation assembly forms an arm extending from a leg with the leg extending from the second pivot connection, where the arm and the leg connect at an angle.

In some aspects, the first linkage is formed by a first side plate adjacent a second side plate, and the second linkage is received between the first linkage first side plate and second side plate. In some aspects, the second linkage is formed by a first side plate and an adjacent second side plate, and the second hinge is connected to the second linkage between the second linkage first side plate and second side plate.

BRIEF DESCRIPTION OF THE DRAWINGS

The present disclosed subject matter is described herein with reference to the following drawing figures that represent exemplary embodiments illustrating various objects and features thereof, with greater emphasis being placed on clarity rather than scale.

DETAILED DESCRIPTION

The drawings show an implementation of the disclosed subject matter used for rotation of a flip axle assembly 100 rotatably mounted to a trailer assembly 300, such as a lowboy trailer. The flip axle assembly 100 is pivoted between a first position or deployed position whereby the wheels 120 of the flip axle assembly engage a surface, such as the ground, for use when transporting a load requiring increased wheel contact with the surface or a roadway, such as a heavy load, and a second position or stowed position whereby the axle assembly is removed from surface contact when not in use. An aspect of the disclosed subject matter is a rotation assembly 128 for the flip axle assembly 100 that has components that protrude minimally above the surface of the decking 308, 114 that in turn maximizes the usable surface area of the trailer assembly 300 and minimizes damage to the rotation assembly 128 components.

Figure 1:
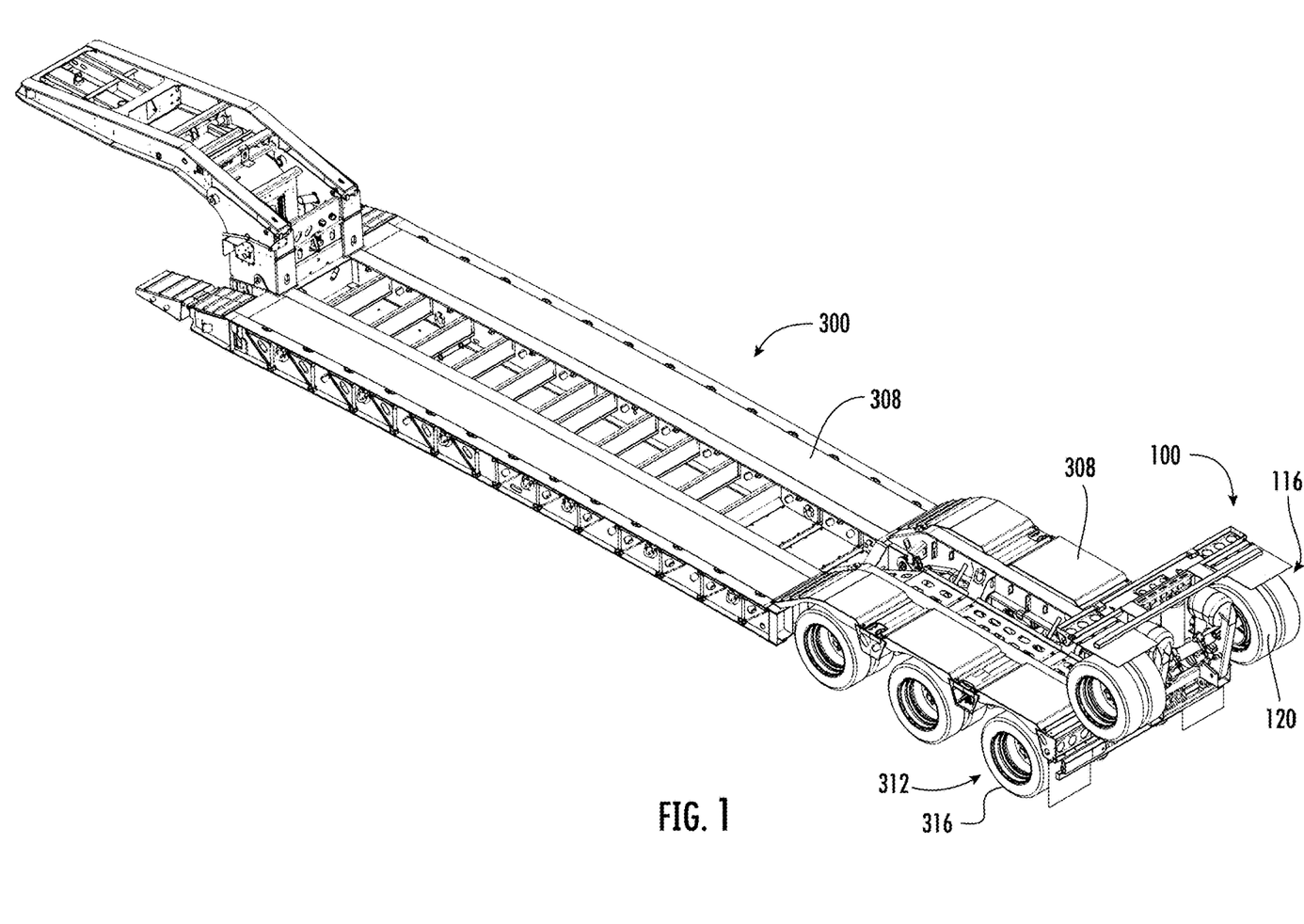
FIG. 1 is an isometric view of a flip axle assembly and trailer assembly embodying principles of the disclosed subject matter, where the flip axle assembly is rotated ninety degrees from engagement with the ground.
Figure 2:
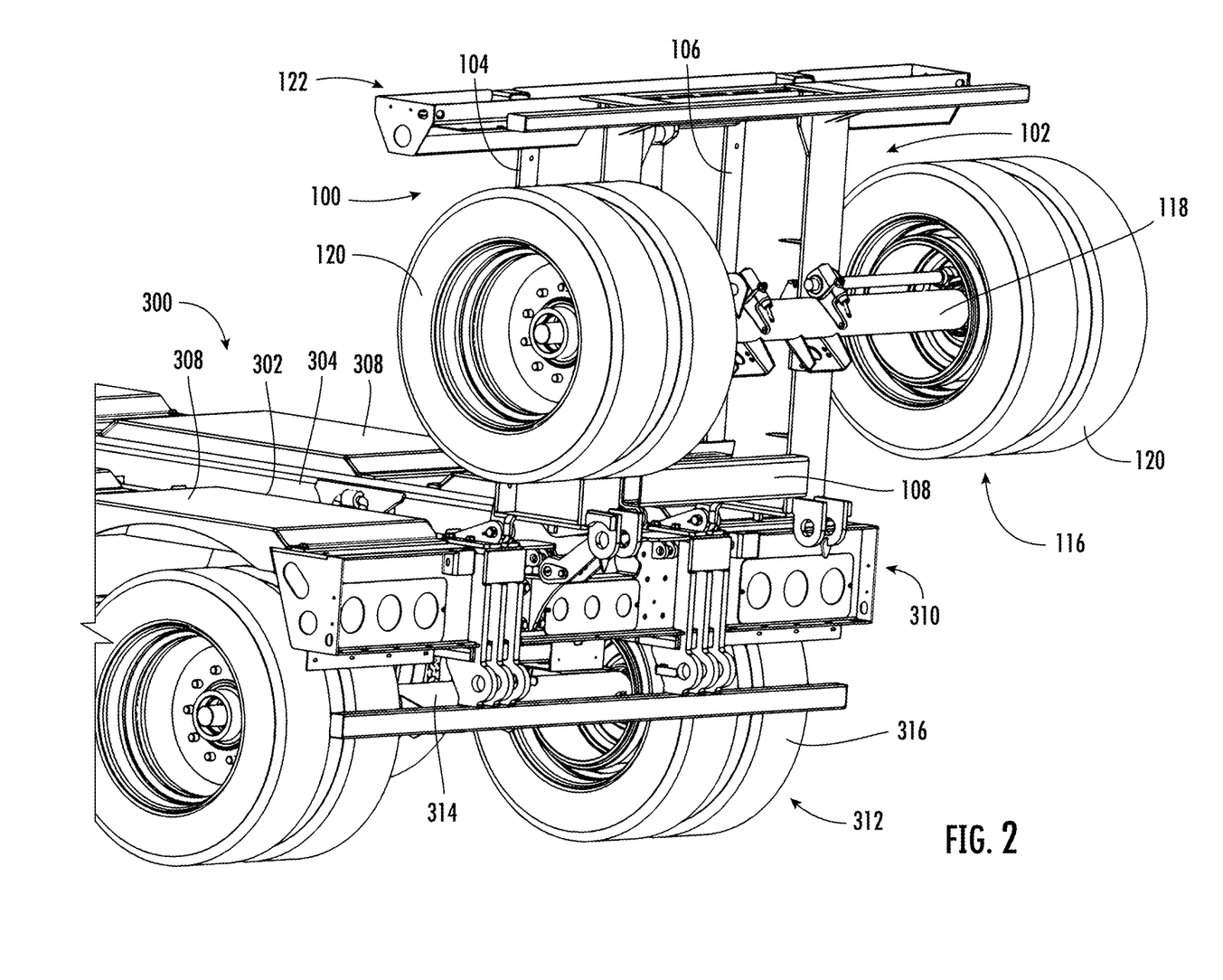
FIG. 2 is a rear elevation view of the flip axle assembly of FIG. 1.

FIGS. 1-2 show the flip axle assembly 100 cooperating with a trailer assembly 300 at the rear of the trailer assembly 300 where the axle assembly is shown in an intermediate position between the deployed position and the stowed position. FIGS. 3-8 have various structural features of the flip axle assembly 100, suspension system, and trailer assembly 300 removed to highlight components of the rotation assembly 128.

The disclosed subject matter will first be described as the components relate to each other as they appear when the flip axle assembly 100 is in the deployed position. The trailer assembly 300 has structural members allowing pivoting attachment of the flip axle assembly 100. Adjacent first and second rails 302, 304 extend from a rear end 310 of the trailer assembly 300 toward the front of the trailer assembly. The rails 302, 304 are connected by one or more cross members 306, which underly decking 308, together supporting a load on the trailer assembly 300. One or more axle assemblies 312 depend from the rails 302, 304, via a suspension system, and have wheels 316 rotatable on an axle 314 for supporting the trailer assembly 300 upon the ground. A first mounting bracket 320 is connected to the trailer assembly 300 first rail 302 adjacent the rear end 310, and an adjacent second mounting bracket 350 is connected to the second rail 304 adjacent the rear end 310. In an implementation the brackets are mounted by welding or by fasteners 334, such as a nut and bolt combination. The first mounting bracket 320 pivotally receives a first attachment bracket 123 of the rotation assembly 128 forming a first pivot connection, and the second mounting bracket 350 pivotally receives a second attachment bracket 125 forming a pivot connection. In an implementation, the first mounting bracket 320 is formed by first and second side plates 324, 328 extending from a back plate 322 secured to the first rail 302 with the first attachment bracket 123 received between the side plates, and the second mounting bracket 350 is formed by first and second side plates 354, 358 extending from a back plate 352 with the second attachment bracket 125 received between the side plates. The mounting bracket side plates form apertures 326, 330, and apertures 356, 360 for receiving pins 332, 362, for pivotally connecting the flip axle assembly 100 to the trailer assembly 300.

The flip axle assembly 100 has a frame assembly 102 formed by adjacent first and second rails 104, 106 extending from a rear end 122 at the rear of the flip axle assembly to a front portion 110, and one or more crossbars 108 connect the rails. In an implementation, an axle assembly 116 is connected to the rails 104, 106, having wheels 120 rotatable on an axle 118 for supporting the flip axle assembly 100 upon the surface the trailer assembly 300 is traveling on.

The rotation assembly 128 has a series of pivotally connected brackets and links articulated by a rotation mechanism 240 to translate the flip axle assembly 100 between the stowed position and deployed position and the intermediate positions in-between. In an implementation, two or more rotation assemblies 128 with corresponding rotation mechanisms 240 can be used to rotate the flip axle assembly 100. The first attachment bracket 123 is attached to the front portion 100 of the first rail 104, and the second attachment bracket 125 is attached to the front portion 100 of the second rail 106. Brackets 123, 125 are operably connected to the rotation assembly 128. In an implementation, the first bracket 123 is operably connected to a first linkage 158. In an implementation, a crossbar 130 is connected to and extends between attachment brackets 123, 125, providing for attachment of a first hinge or crossbar hinge 136 of the rotation assembly 128. The crossbar hinge 136 provides a pivot connection with a first linkage 158 of the rotation assembly 128, forming a fourth pivot connection. In an implementation, the crossbar hinge 136 is suitably attached to the crossbar 130 at a top face 132 and front face 134, and formed by adjacent first side plate 138 and second side plate 144 forming crescent-shaped upper edges 139, 145, respectively, that extend generally from the crossbar 130 top face 132 forward in front of the crossbar front face 134, forming tabs 140, 146 adjacent the front face 134. In an implementation, the crossbar hinge 136 is formed from one piece of material. Upper edges 139, 145 present a low-profile rounded surface, free of sharp edges, to avoid catching the crossbar hinge 136 on objects that straddle the hinge or that may traverse the hinge when the flip axle assembly 100 is in the deployed position. A tubular bearing 150 extends between apertures formed in the tabs 140, 146, respectively for receiving a pin 154 for rotatably connecting the crossbar hinge 136 to the first linkage 158.

Figure 3:
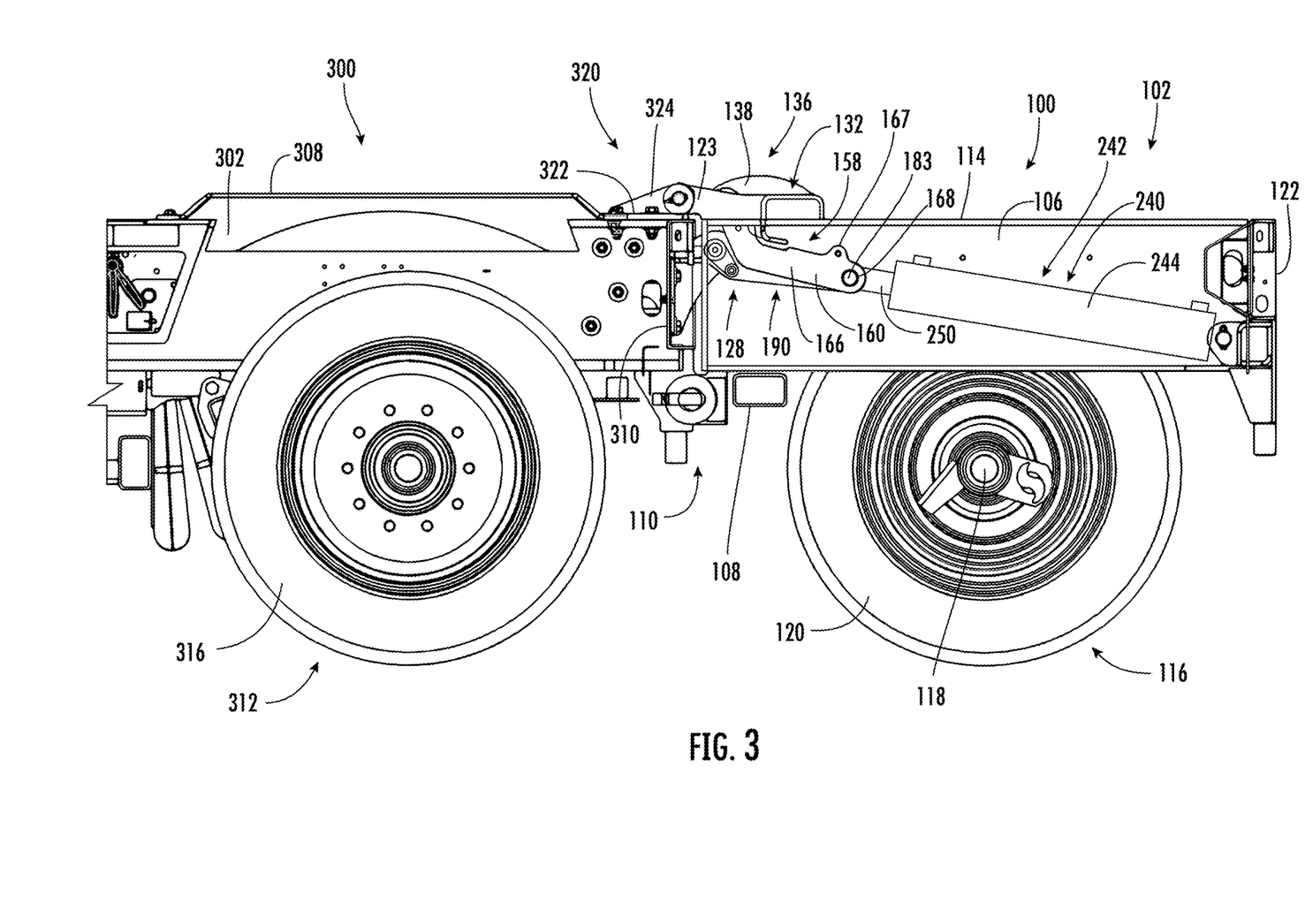
FIG. 3 is a side elevation view of a flip axle assembly of the disclosed subject matter in a first position employing an implementation of the disclosed subject matter where the flip axle wheels are engaging the ground.
Figure 4:
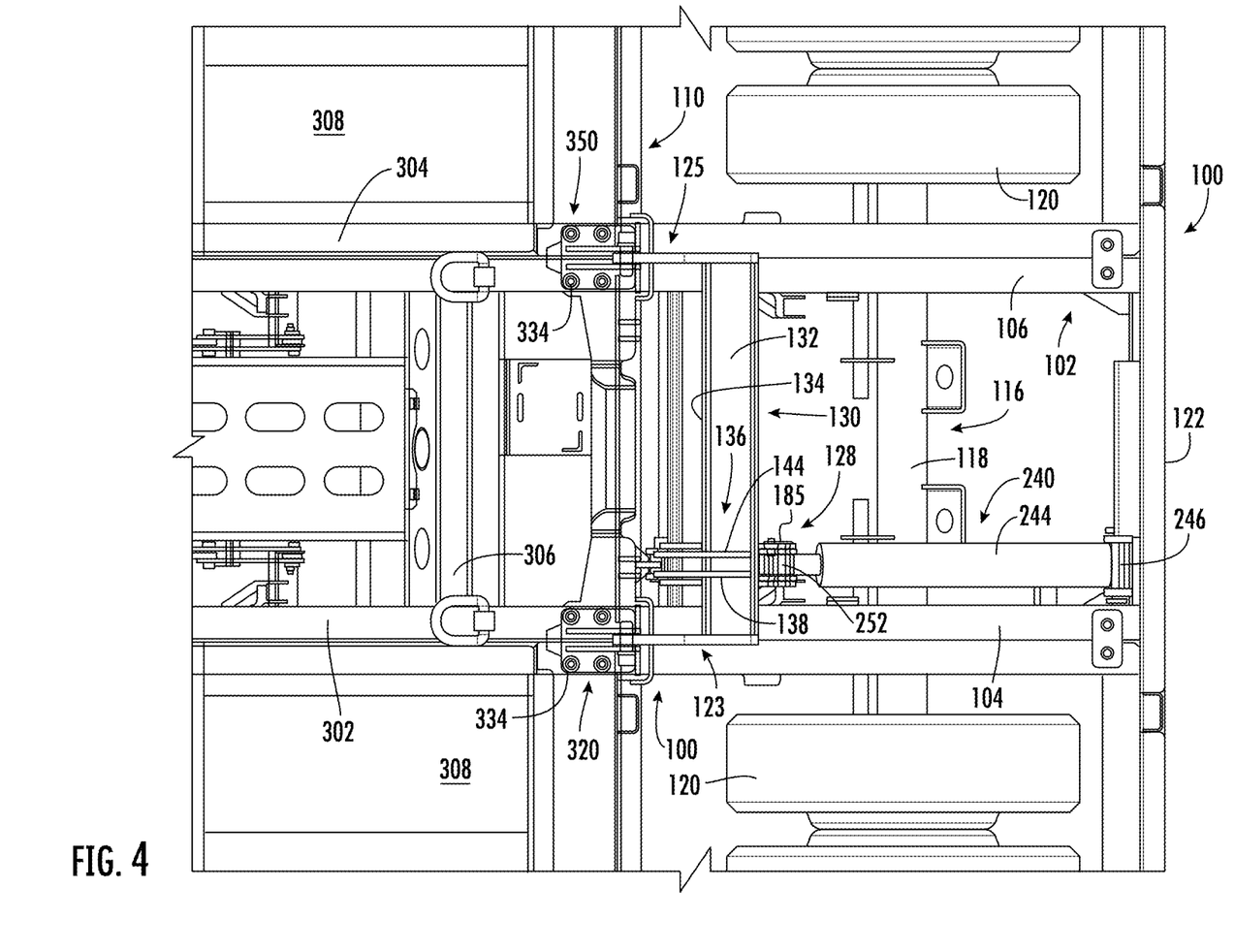
FIG. 4 is an enlarged plan view of the flip axle assembly in the deployed position.

The doglegged-shaped first linkage 158 is formed from an adjacent first side plate 160 and second side plate 172, connected by a web 170. The plates have arms 164, 176 forming apertures 162, 174, and extend from the crossbar hinge 136 to form legs 166, 178 that extend at an angle from the arms terminating in apertures 169, 181. The arms 164, 176 and legs 166, 178 connect at an angle, and extend under the crossbar 130 and decking 114 when the flip axle assembly 100 wheels 316 are engaging the ground. In an implementation, the tabs 140, 146 of the crossbar hinge are disposed between the arms 164, 176, and a retention plate 156 of the pin 154 is secured to arm 176. Tabs 167, 179 adjacent the apertures 169, 181 form apertures 168, 180 for retaining a retention plate 185 of a pin 183, forming a second pivot connection, thereby pivotally connecting the first linkage 158 to the second linkage 190 and the rotation mechanism 240. In an implementation, the crossbar hinge 136 is received between the first and second side plates 160, 172. The second linkage 190 is formed from an adjacent first side plate 192 and second side plate 206 connected by a web 204. The plates 192, 206 have elongated first arms 196, 210 forming apertures, and extend from the second linkage 190 to form shorter second arms 198, 212 that extend at an angle from the first arms terminating in apertures. In an implementation, the first arms 196, 210 are disposed between legs 166, 178. A pin 216 passes through the apertures of the second arms 198, 212 for pivotally connecting the second linkage 190 to a second hinge or trailer tail gate hinge 224 mounted to the tail gate 310 of the trailer assembly 300. The pivot connection between the second linkage and trailer gate hinge forms a third pivot connection. Thus, the third pivot connection is below and rearward of the first pivot connection. Pins 154, 183, and 216 include greaseable bushings for longer wear life of the rotation assembly 128. In an implementation, the second linkage 190 side plates 192, 206 are received between the first linkage 158 side plates 160, 172, whereby the second linkage 190 nests with the first linkage 158 when the flip axle assembly 100 is in the deployed position (FIGS. 3-4).

The trailer gate hinge 224 is formed by a flange 226 extending from a back plate 228. Tabs 230 on either side of the flange are connected to the back plate 228 to provide additional structural support to the hinge. The flange 226 forms a tubular bearing 220 for receiving the pin 216. In an implementation, the tubular bearing 220 extends between the apertures of the second arms 198, 212. In an implementation, the pivoting connection between the second linkage 190 and the trailer gate hinge 224 is below and rearward of the pivoting connection between the trailer mounting bracket and the attachment bracket.

In an implementation, the rotation mechanism 240 is an actuator that is connected to the flip axle assembly at a first end, and operably connected to the rotation assembly 128 at a second end. In an implementation, the rotation mechanism 240 second end is connected to the pivoting connection at the first linkage 158 and second linkage 190. In an implementation, the rotation mechanism is a hydraulic actuator 242 with a barrel 244 forming a clevis 246 at the first end pivotally connected to the rear end 122, and a rod 250 extending from the barrel 244, where the rod forms a clevis 252 connected to the rotation assembly 128 at the connection between the first linkage 158 and the second linkage 190 by the pin 183. The hydraulic actuator 242 is powered and controlled by hydraulic systems known in the trailer art.

In the deployed position (FIG. 4), the mounting brackets 320, 350, attachment brackets 123, 125, crossbar 130, and crossbar hinge 136 extend less than a few inches above rails 302, 304, and surface of the decking 308, 314, minimizing the components of the rotation assembly that extend above and occupy the loading area of the decking 308, 114. The second linkage 190 is nested within the first linkage 158, and they are disposed under the decking 308, 114 or loading surface of the trailer assembly 300 and flip axle assembly 100, so as not to obstruct the loading surface.

The flip axle assembly 100 is rotated from the deployed position (FIG. 4) to the stowed position (FIG. 8) by engaging the rotation mechanism 240 to apply a displacing force to the frame assembly 102 of the flip axle assembly 100 and to the rotation assembly 128. In an implementation, the displacing force is to the rotation assembly 128 through the second pivot connection.

Figure 5:
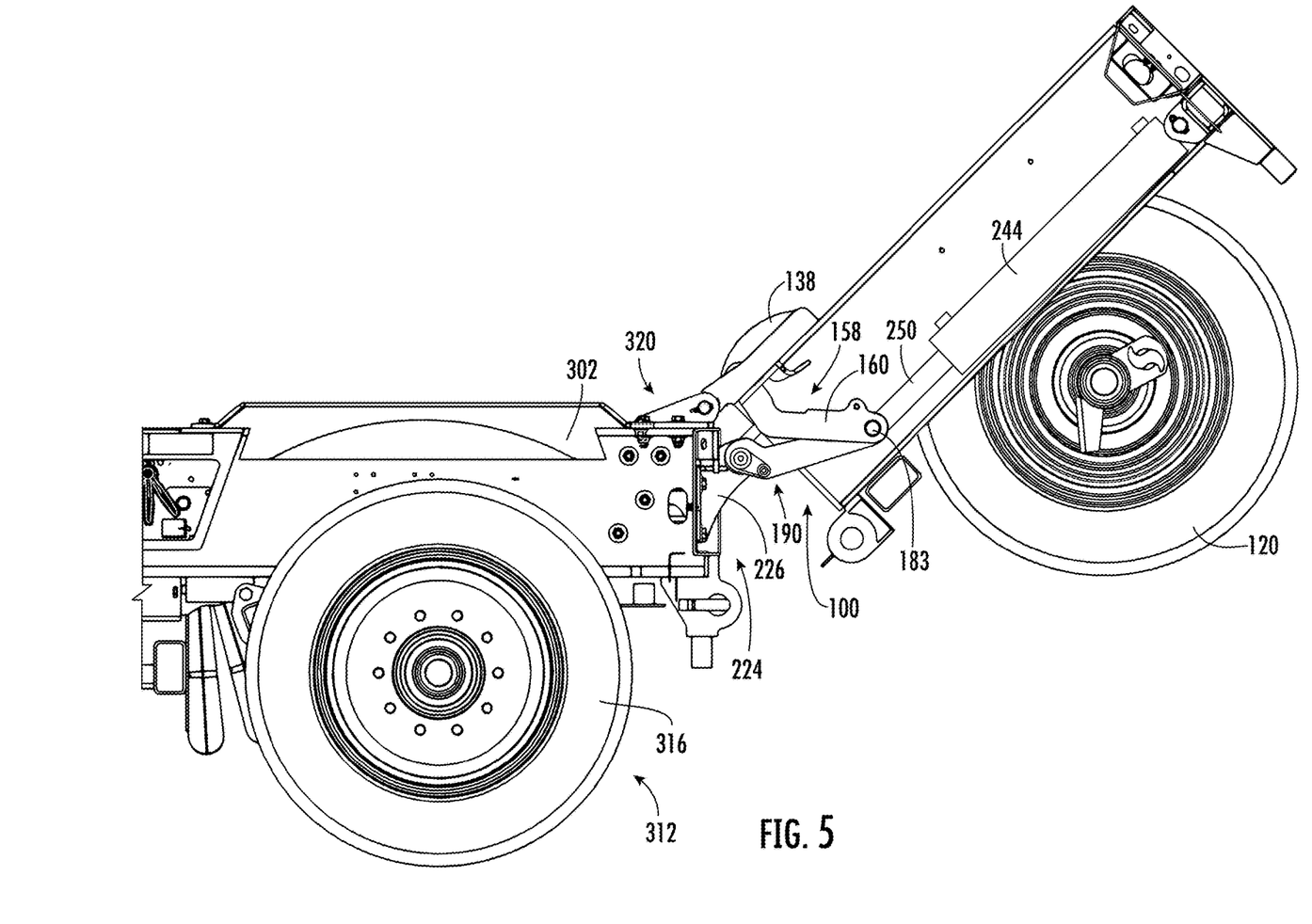
FIG. 5 is a side elevation view of the flip axle assembly of FIG. 4 rotated forty-five degrees from engagement with the ground.

Referring to FIG. 5, as the flip axle assembly 100 is rotated from the deployed position (FIGS. 3-4) to the an elevated position whereby the assembly is generally forty-five degrees from engagement with the ground, the rod 250 is extended from the barrel 244, the first linkage 158 and second linkage 190 rotate about pin 183 and separate from their nested relationship, and the crossbar hinge 136 is elevated above the trailer tail gate hinge 224.

Figure 6:
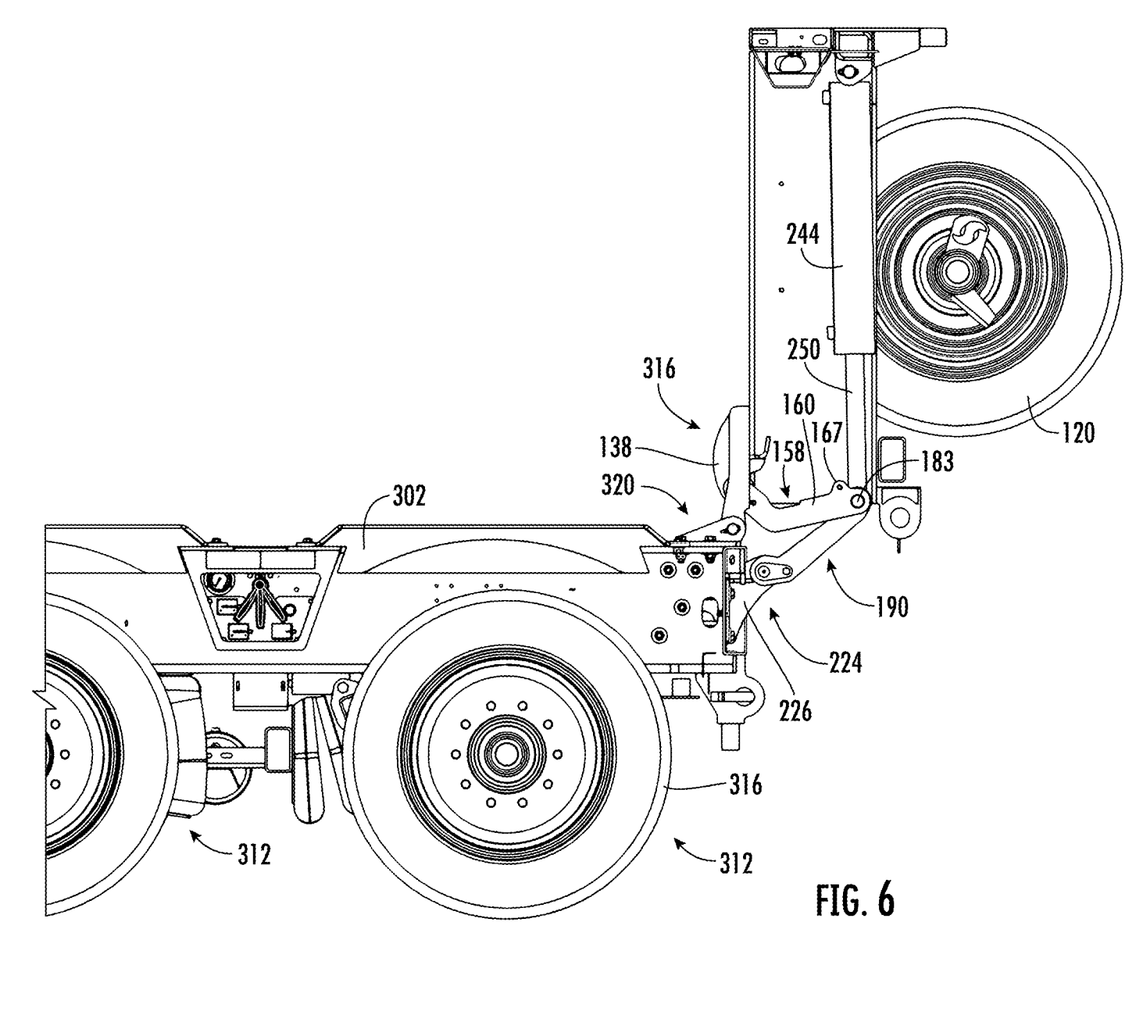
FIG. 6 is a side elevation view of the flip axle assembly of FIG. 4 rotated ninety degrees from engagement with the ground.
Figure 7A:
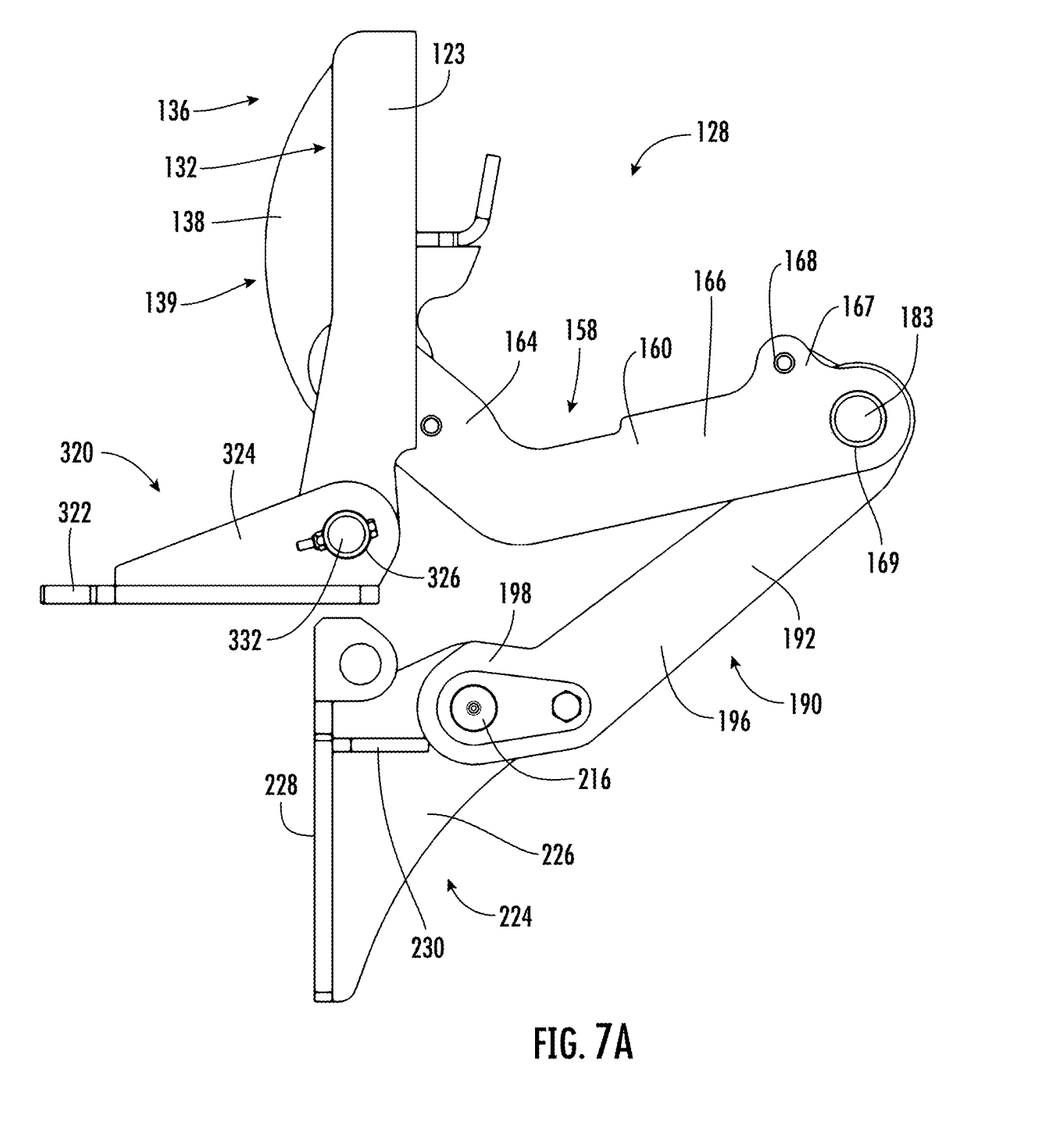
FIG. 7A is a side elevation view of components of the flip axle assembly of FIG. 6.
Figure 7B:
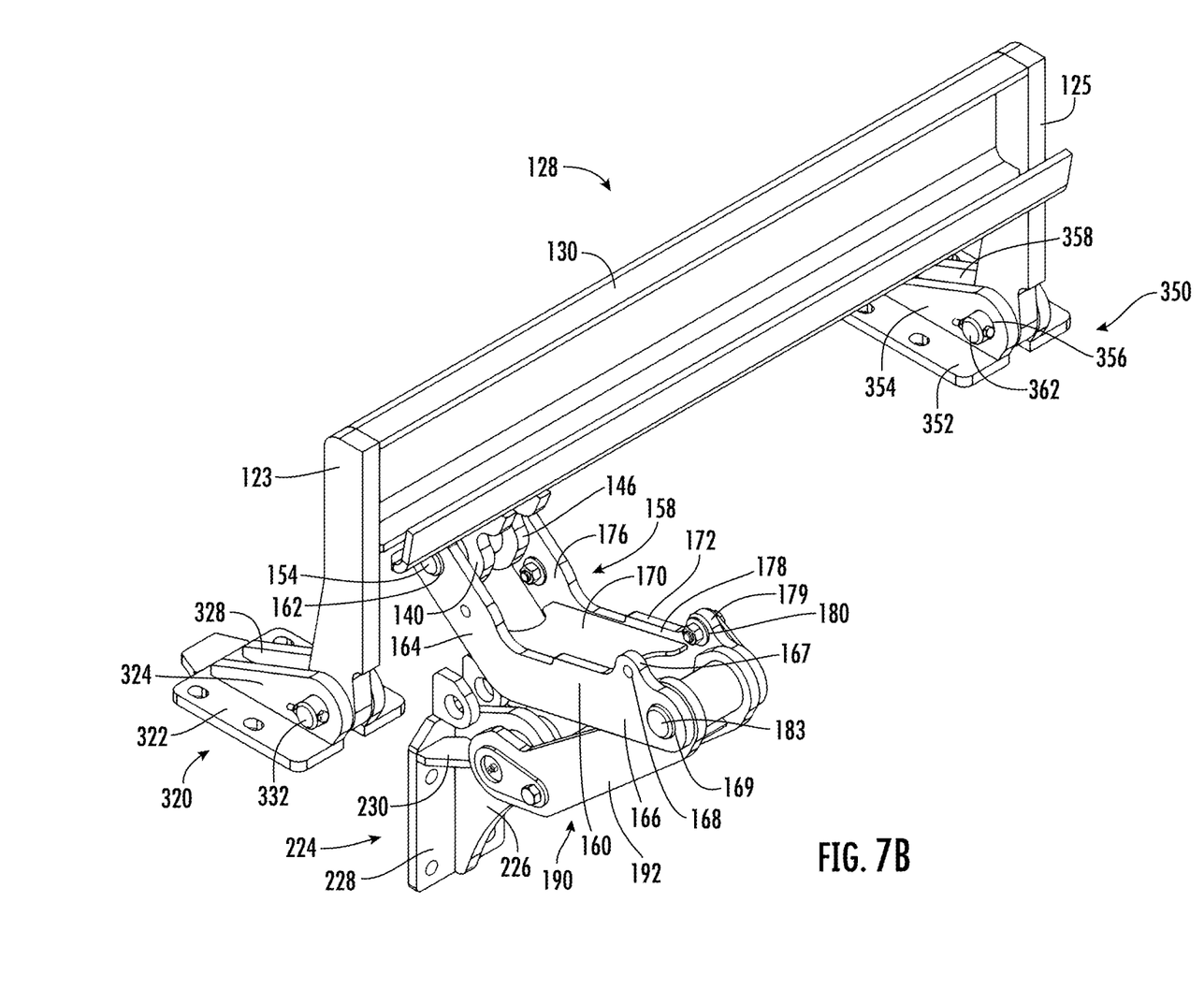
FIG. 7B is an isometric view from above of components of the flip axle assembly of FIG. 7A.
Figure 7C:
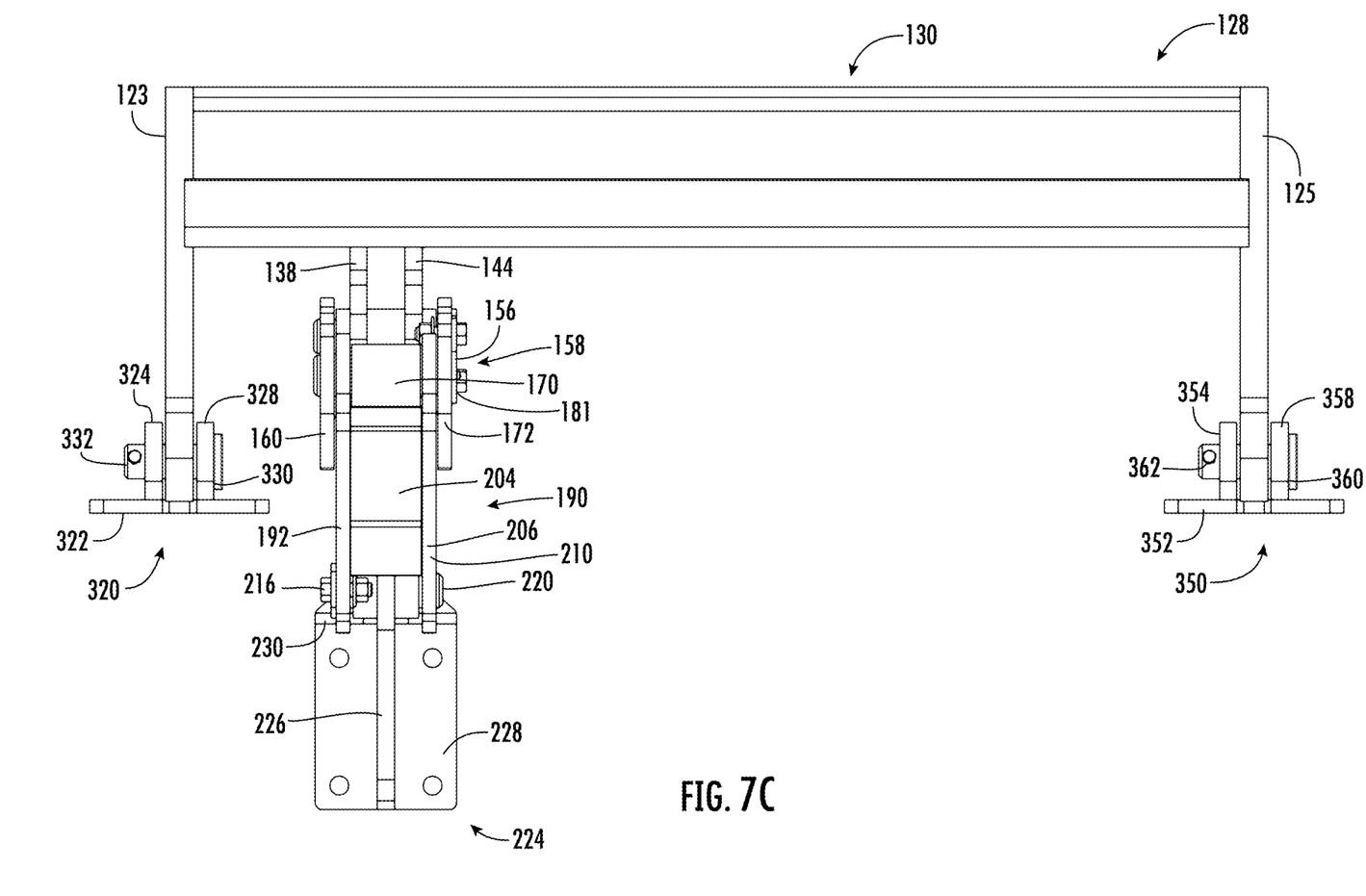
FIG. 7C is a rear elevation view of components of the flip axle assembly of FIG. 7A.
Figure 7D:
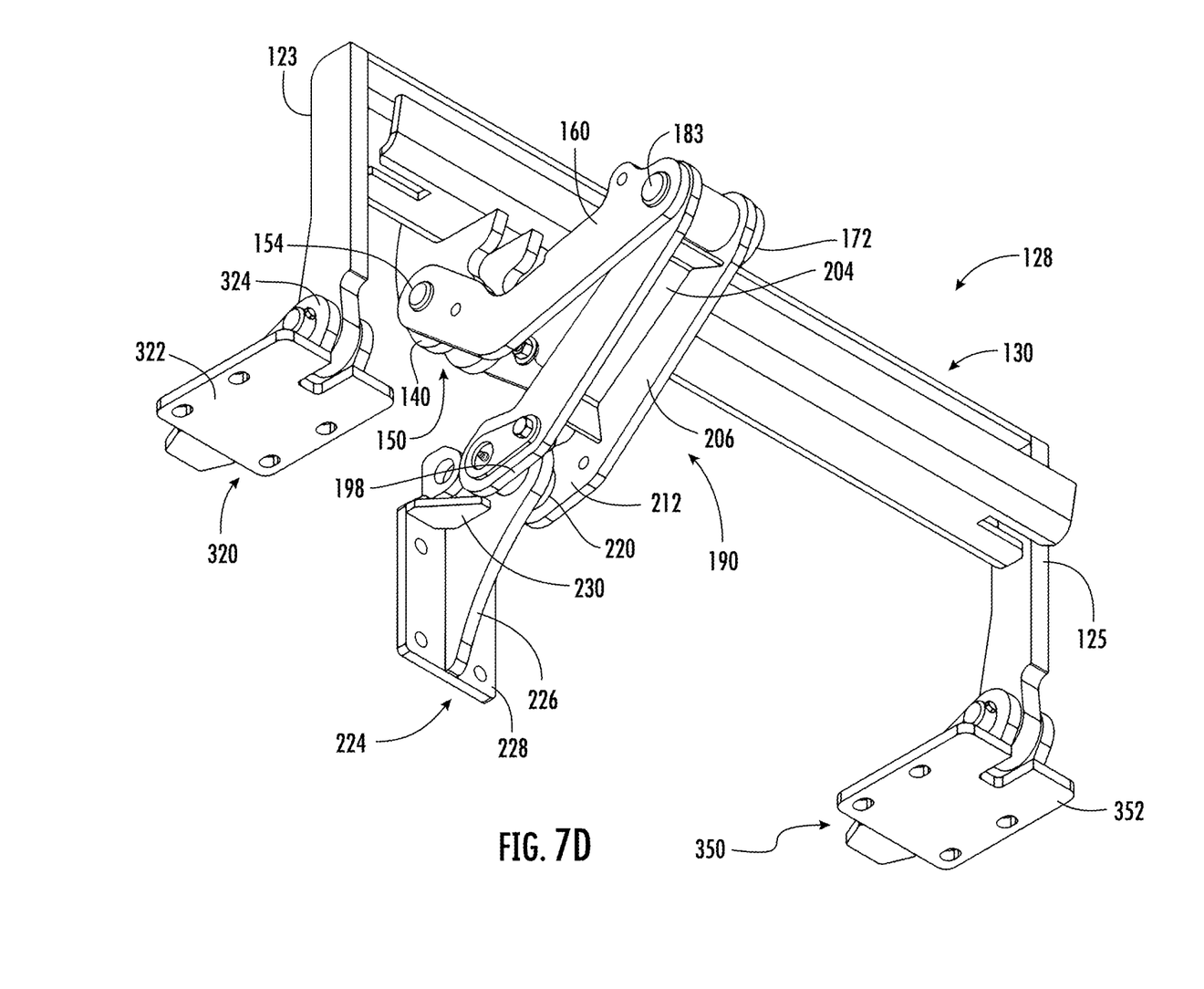
FIG. 7D is an isometric view from below of components of the flip axle assembly of FIG. 7A.
Figure 7E:
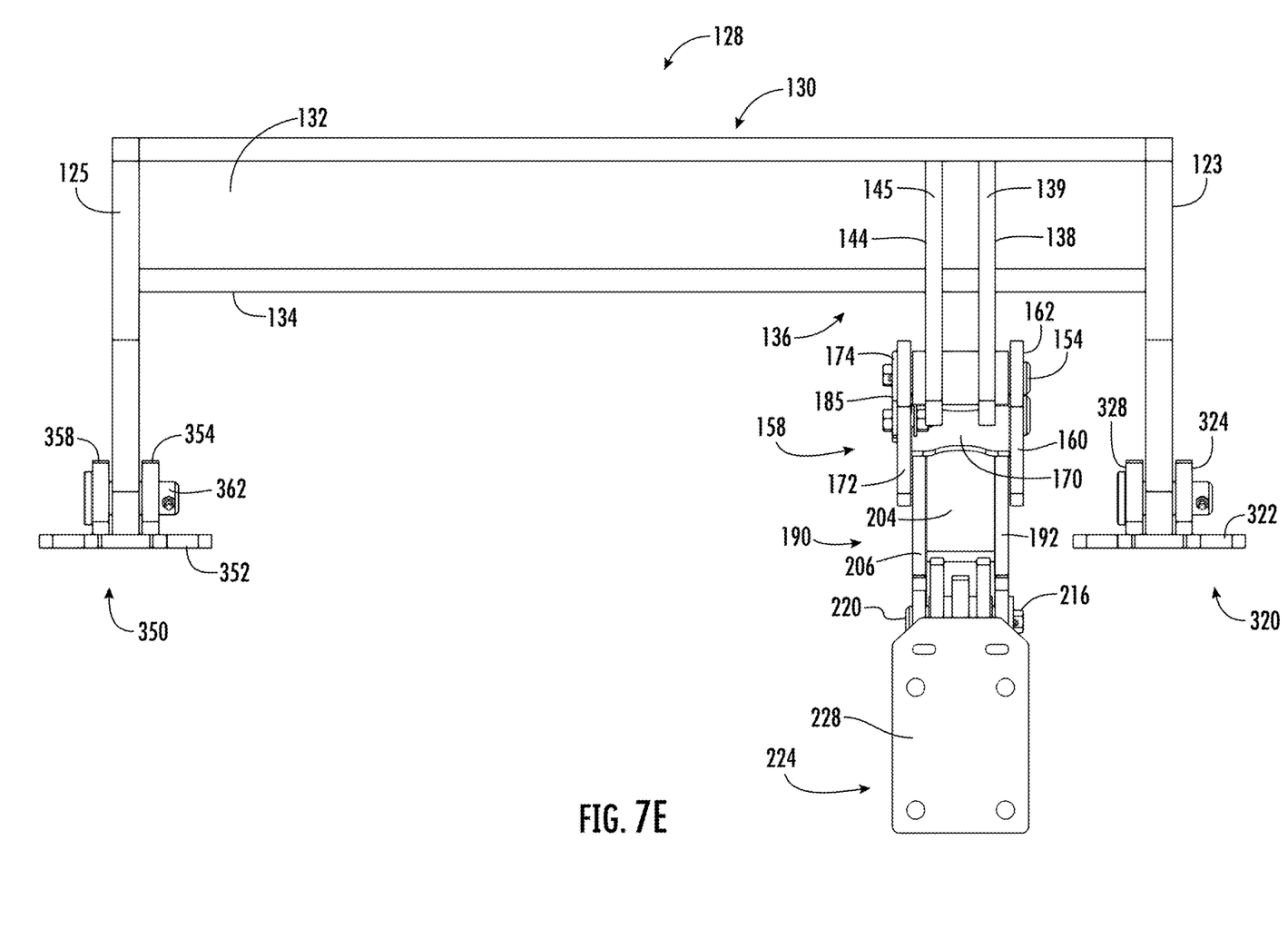
FIG. 7E is a front elevation view of components of the flip axle assembly of FIG. 7A.

Referring to FIG. 6, as the flip axle assembly 100 is rotated from the forty-five-degree position (FIG. 5) to the approximately ninety-degree position (FIG. 6), the rod 250 is further extended from the barrel 244, and the crossbar hinge 136 is elevated above and forward of the trailer tail gate hinge 224.

Figure 8:
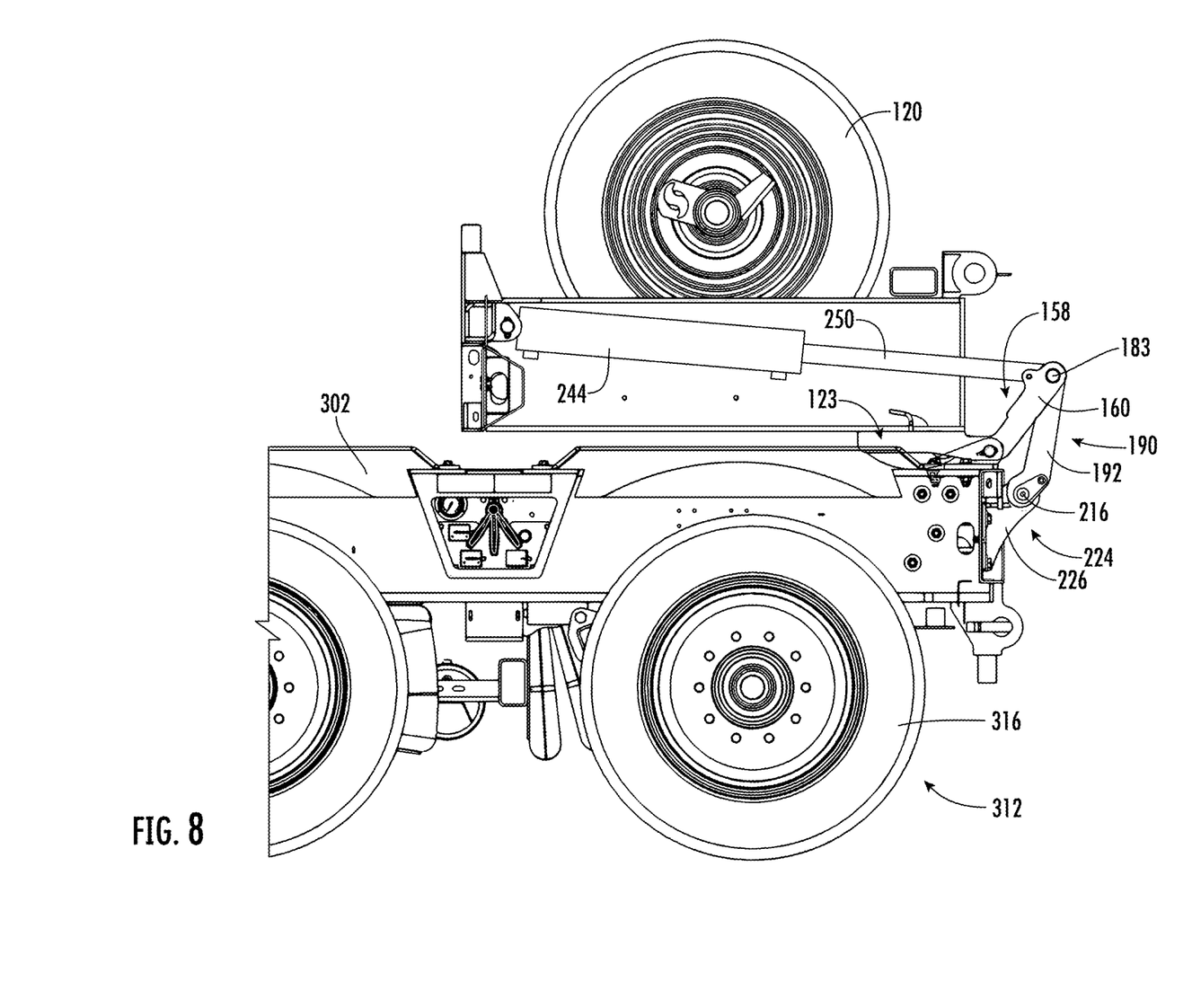
FIG. 8 is a side elevation view of the flip axle assembly of FIG. 4 in a second position where the assembly is rotated one-hundred-eighty degrees from engagement with the ground.

Referring to FIG. 8, as the flip axle assembly 100 is rotated from the approximately ninety-degree position (FIG. 6) to the approximately one-hundred-eighty-degree position or stowed position (FIG. 8), the rod 250 is further extended from the barrel 244, and the crossbar hinge 136 comes to rest forward of the trailer tail gate hinge 224. The flip axle assembly 100 is transitioned from the stowed position to the deployed position by withdrawing the rod 250 into the barrel 244.

In general, the components of the disclosed subject matter can be manufactured from metal, with the decking 114, 308, alternatively made from wood or other non-ferrous resilient material, and with the wheels 120, 316 manufactured from rubber.

Certain terminology used in detailed description is for convenience and for reference only and will not be limiting. For example, up, down, top, bottom, front, back, rear, right, left, forward, rearward, upward, and downward refer to the disclosed subject matter as orientated in the view being referred to, or in reference to such terminology designating the characteristics of an assembly as described in this description. Such terminology will include the words specifically mentioned, derivatives thereof, and words of similar meaning. The patent claims define the protection sought. Examples and other disclosures herein are nonlimiting. The following abstract is a nonlimiting formal requirement.

Having described the disclosed subject matter, what is claimed as new and desired to be secured by Letters Patent is:

1. An apparatus for moving a flip axle assembly relative to a trailer, comprising:
   a first mounting bracket connected to the trailer;
   a first attachment bracket pivotally connected to the first mounting bracket forming a first pivot connection, wherein the first attachment bracket is connected to the flip axle assembly;
   a rotation assembly, comprising:
      a first linkage connected to the first attachment bracket;
      a second linkage pivotally connected to the first linkage, forming a second pivot connection; and
      a hinge connected to the trailer, wherein the hinge is pivotally connected to the second linkage forming a third pivot connection; and
   a rotation mechanism operably connected to the rotation assembly.

2. The apparatus of claim 1, further comprising:
   a second mounting bracket connected to the trailer;
   a second attachment bracket pivotally connected to the second mounting bracket, wherein the second attachment bracket is connected to the flip axle assembly;
   a crossbar connected to the first attachment bracket and the second attachment bracket; and
   wherein the first linkage is connected to the first attachment bracket by the crossbar.

3. The apparatus of claim 1, further comprising:
   wherein the third pivot connection is below and rearward of the first pivot connection.

4. The apparatus of claim 1, further comprising:
   wherein the first linkage comprises:
      an arm extending from a leg;
      wherein the leg extends from the second pivot connection; and
      wherein the arm and the leg connect at an angle.

5. The apparatus of claim 1, further comprising:
   wherein the rotation mechanism operably connected to the flip axle assembly.

6. The apparatus of claim 5, further comprising:
   wherein the rotation mechanism is an actuator;
   wherein extension of the actuator moves the flip axle assembly to a stowed position; and
   wherein retraction of the actuator moves the flip axle assembly to a deployed position.

7. The apparatus of claim 1, further comprising:
   a crossbar hinge operably connected to the first attachment bracket;
   wherein the crossbar hinge forms a fourth pivot connection between the first linkage and the first attachment bracket; and
   wherein an operable connection between the first linkage and the first attachment bracket is the fourth pivot connection.

8. The apparatus of claim 7, further comprising:
   a second mounting bracket connected to the trailer;
   a second attachment bracket pivotally connected to the second mounting bracket, wherein the second attachment bracket is connected to the flip axle assembly;
   a crossbar connected to the first attachment bracket and the second attachment bracket; and
   wherein the crossbar hinge is connected to the crossbar.

9. The apparatus of claim 8, further comprising:
wherein the crossbar hinge forms a crescent-shaped upper edge.

10. The apparatus of claim 1, further comprising:
wherein the trailer includes wheels rotatable on an axle for supporting the trailer upon a surface; and
wherein the flip axle assembly includes wheels rotatable on an axle for supporting the flip axle assembly upon the surface.

11. An apparatus for moving a flip axle assembly relative to a trailer, comprising:
a first mounting bracket connected to the trailer;
a first attachment bracket pivotally connected to the first mounting bracket forming a first pivot connection, wherein the first attachment bracket is connected to the flip axle assembly;
a rotation assembly, comprising:
a first linkage, comprising:
a first side plate adjacent a second side plate; and
wherein the first linkage is connected to the first attachment bracket;
a second linkage pivotally connected to the first linkage, forming a second pivot connection, wherein the second linkage is received between the first linkage first side plate and second side plate; and
a hinge connected to the trailer, wherein the hinge is pivotally connected to the second linkage forming a third pivot connection; and
a rotation mechanism operably connected to the rotation assembly.

12. The apparatus of claim 11, further comprising:
wherein the second linkage comprises a first side plate adjacent a second side plate.

13. The apparatus of claim 12, further comprising:
wherein the hinge is connected to the second linkage between the second linkage first side plate and second side plate.

14. The apparatus of claim 11, further comprising:
wherein the third pivot connection is below and rearward of the first pivot connection.

15. The apparatus of claim 11, further comprising:
wherein the first linkage forms:
an arm extending from a leg;
wherein the leg extends from the second pivot connection; and
wherein the arm and the leg connect at an angle.

16. The apparatus of claim 11, further comprising:
wherein the rotation mechanism operably connected to the flip axle assembly and rotation assembly.

17. The apparatus of claim 11, further comprising:
a crossbar hinge operably connected to the first attachment bracket;
wherein the crossbar hinge forms a fourth pivot connection between the first linkage and the first attachment bracket; and
wherein an operable connection between the first linkage and the first attachment bracket is the fourth pivot connection.

18. The apparatus of claim 11, further comprising:
wherein the trailer includes wheels rotatable on an axle for supporting the trailer upon a surface; and
wherein the flip axle assembly includes wheels rotatable on an axle for supporting the flip axle assembly upon the surface.

19. A trailer, comprising:
a flip axle assembly;
a first mounting bracket connected to the trailer;
a first attachment bracket pivotally connected to the first mounting bracket forming a first pivot connection, wherein the first attachment bracket is connected to the flip axle assembly;
a rotation assembly, comprising:
a first linkage, comprising:
a first side plate adjacent a second side plate; and
wherein the first linkage is connected to the first attachment bracket;
a second linkage pivotally connected to the first linkage, forming a second pivot connection, wherein the second linkage is received between the first linkage first side plate and second side plate; and
a hinge connected to the trailer, wherein the hinge is pivotally connected to the second linkage forming a third pivot connection;
wherein the third pivot connection is below and rearward of the first pivot connection; and
a rotation mechanism operably connected to the rotation assembly.

20. The trailer of claim 19, further comprising:
wherein actuation of the rotation mechanism moves the flip axle assembly.

* * * * *